(12) United States Patent
Petrosky (10) Patent No.: US 11,238,997 B2
(45) Date of Patent: Feb. 1, 2022

(54) NUCLEAR REACTOR SYSTEM TRANSMITTER DEVICE STRUCTURED TO WIRELESSLY EMIT A SIGNAL BASED ON DETECTED NEUTRON FLUX

(71) Applicant: Westinghouse Electric Company LLC, Cranberry Township, PA (US)

(72) Inventor: Lyman J. Petrosky, Latrobe, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 769 days.

(21) Appl. No.: 15/952,597

(22) Filed: Apr. 13, 2018

(65) Prior Publication Data
US 2019/0318835 A1 Oct. 17, 2019

(51) Int. Cl.
*G21C 17/108* (2006.01)
(52) U.S. Cl.
CPC .................. *G21C 17/108* (2013.01)
(58) Field of Classification Search
CPC ..................... G21C 17/102; G21C 17/108
USPC ...................... 376/254; 250/390.01
See application file for complete search history.

(56) References Cited

U.S. PATENT DOCUMENTS

| 3,330,954 | A | * | 7/1967 | Harrison | G01T 3/00 376/255 |
| 4,943,683 | A | * | 7/1990 | Utsunomiya | G21C 17/102 376/245 |
| 2012/0177166 | A1 | * | 7/2012 | Seidel | G21C 17/108 376/254 |

* cited by examiner

*Primary Examiner* — Jack W Keith
*Assistant Examiner* — Joshua C Devorkin
(74) *Attorney, Agent, or Firm* — K&L Gates LLP (57) ABSTRACT

Disclosed is a transmitter device comprising a neutron detector structured to generate electrical current from neutron flux, and an oscillator circuit comprising an electrostatic switch electrically connected to the neutron detector, wherein the electrostatic switch is moveable based on the neutron detector. The transmitter device further comprises an antenna electrically connected with the electrostatic switch. The oscillator circuit is structured to pulse the antenna based on the neutron detector, wherein a period between pulses is related to the neutron flux. The antenna is structured to emit a signal corresponding to a number of characteristic values of the oscillator circuit.

17 Claims, 9 Drawing Sheets

NUCLEAR REACTOR SYSTEM TRANSMITTER DEVICE STRUCTURED TO WIRELESSLY EMIT A SIGNAL BASED ON DETECTED NEUTRON FLUX

BACKGROUND

Field

The disclosed concept pertains generally to nuclear reactor systems. The disclosed concept also pertains to transmitter devices for nuclear reactor systems. The disclosed concept further pertains to methods of measuring environmental conditions with a transmitter device.

Background Information

Figure 1:
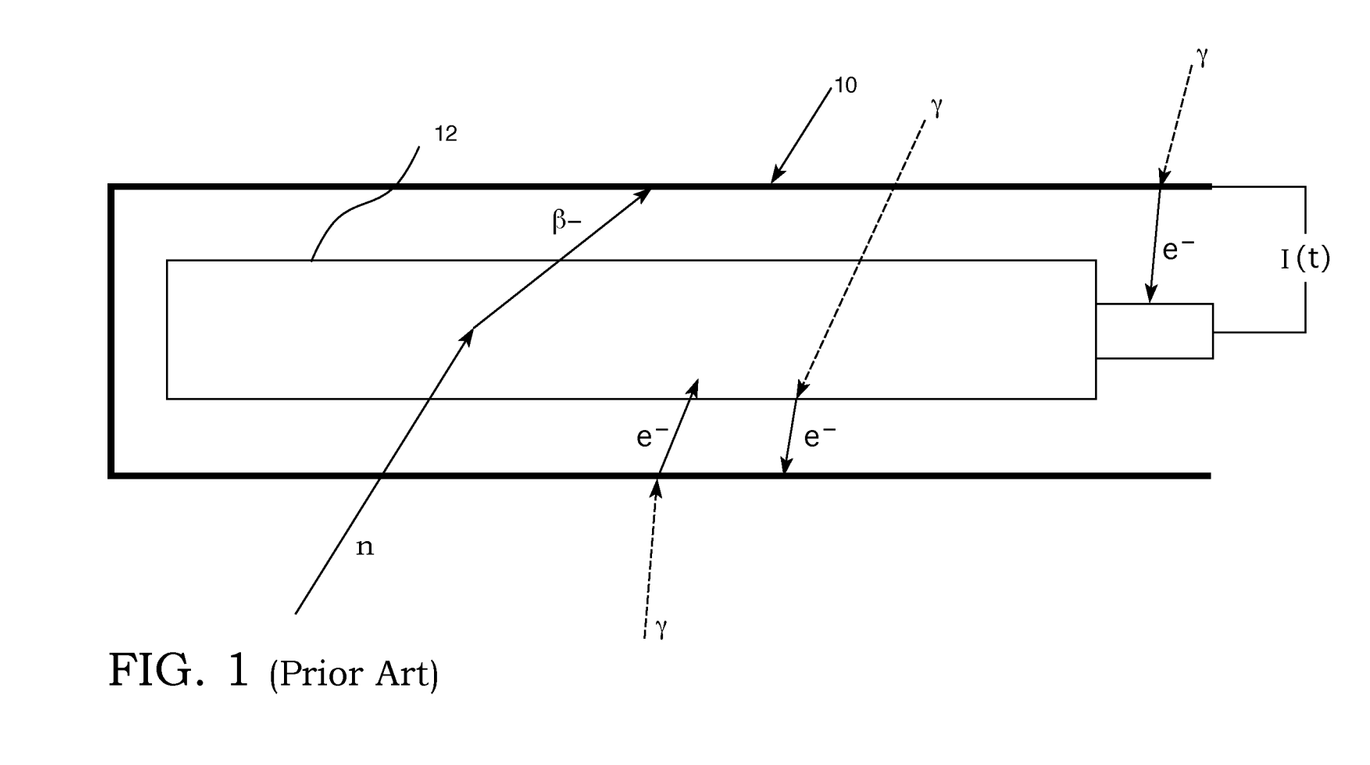
FIG. 1 is a schematic representation of a self-powered radiation detector.
Figure 2A:
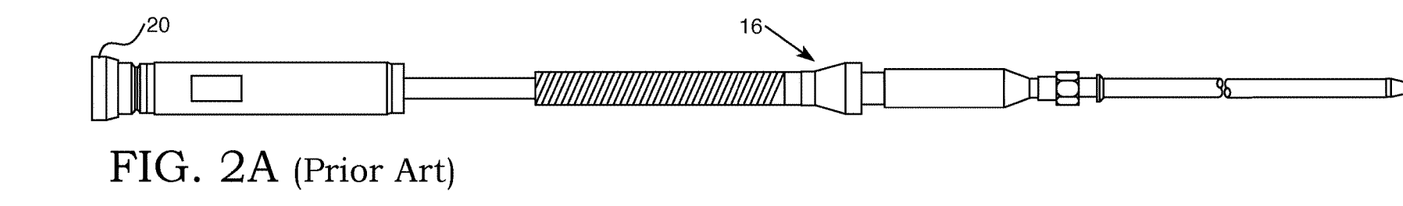
FIG. 2A is a plan view of an in-core instrument thimble.
Figure 2B:
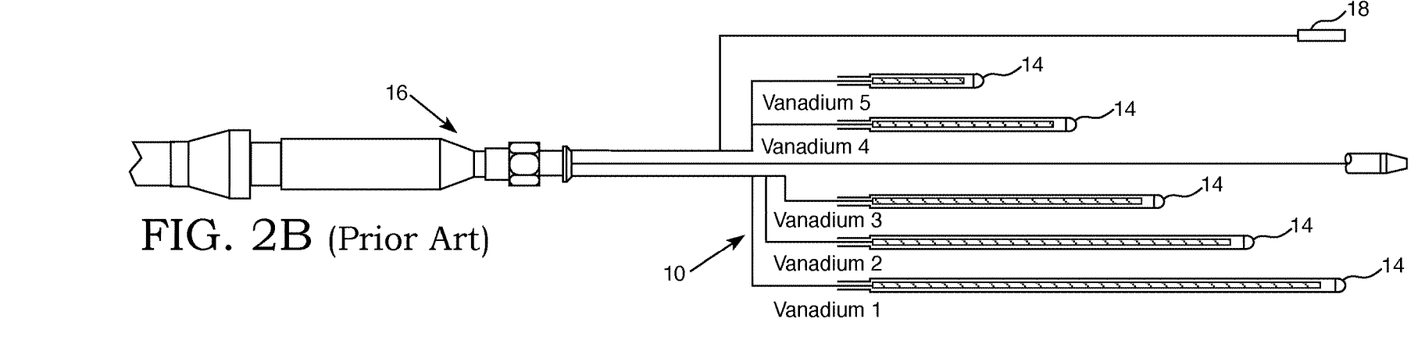
FIG. 2B is a schematic view of the interior of the forward sheath of the in-core instrument thimble assembly of FIG. 2A.
Figure 2C:
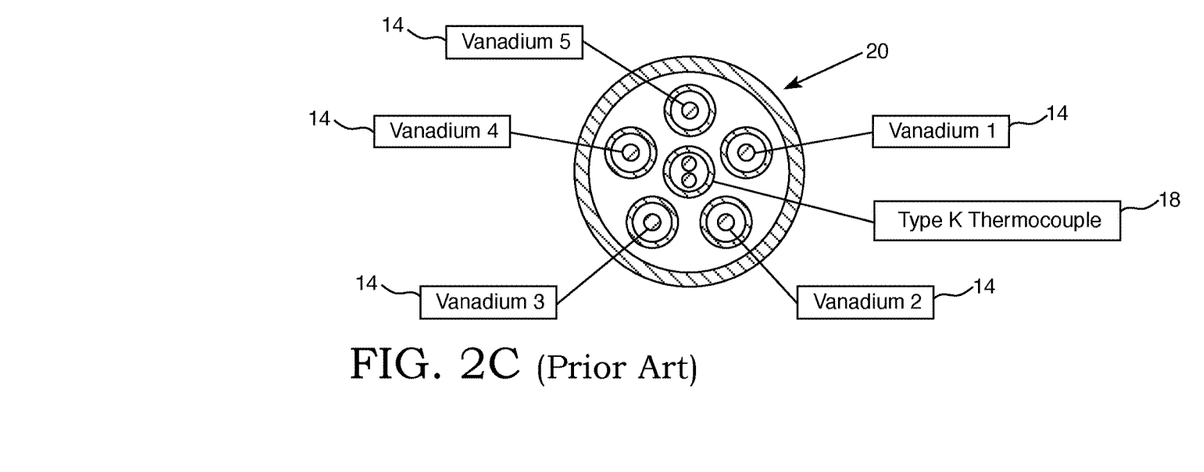
FIG. 2C is a sectional view of the electrical connector at the rear end of the in-core instrument thimble assembly of FIG. 2A.

In many state-of-the-art nuclear reactor systems in-core sensors are employed for measuring the radioactivity within the core at a number of axial elevations. These sensors are used to measure the radial and axial distribution of the power inside the reactor core. This power distribution measurement information is used to determine whether the reactor is operating within nuclear power distribution limits. The typical in-core sensor used to perform this function is a self-powered detector that produces an electric current that is proportional to the amount of fission occurring around it. This type of sensor does not require an outside source of electrical power to produce the current and is commonly referred to as a self-powered detector and is more fully described in U.S. Pat. No. 5,745,538, issued Apr. 28, 1998, and assigned to the Assignee of this invention. FIG. 1 provides a diagram of the mechanisms that produce the current I(t) in a self-powered detector element 10. A neutron sensitive material such a vanadium is employed for the emitter element 12 and emits electrons in response to neutron irradiation. Typically, the self-powered detectors are grouped within instrumentation thimble assemblies. A representative in-core instrumentation thimble assembly 16 is shown in FIG. 2. The signal level generated by the essentially non-depleting neutron sensitive emitter 12 shown in FIG. 1 is low, however, a single, full core length neutron sensitive emitter element provides an adequate signal without complex and expensive signal processors. The proportions of the full length signal generated by the single neutron sensitive emitter element attributable to various axial regions of the core are determined from apportioning the signal generated by different lengths of gamma sensitive elements 14 which define the axial regions of the core and are shown in FIG. 2. The apportioning signals are ratioed which eliminates much of the effects of the delayed gamma radiation due to fission products. The in-core instrumentation thimble assemblies also include a thermocouple 18 for measuring the temperature of the coolant exiting the fuel assemblies. The electrical signal output from the self-powered detector elements and the thermocouple in each in-core instrumentation thimble assembly in the reactor core are collected at the electrical connector 20 and sent to a location well away from the reactor for final processing and use in producing the measured core power distribution.

Figure 3:
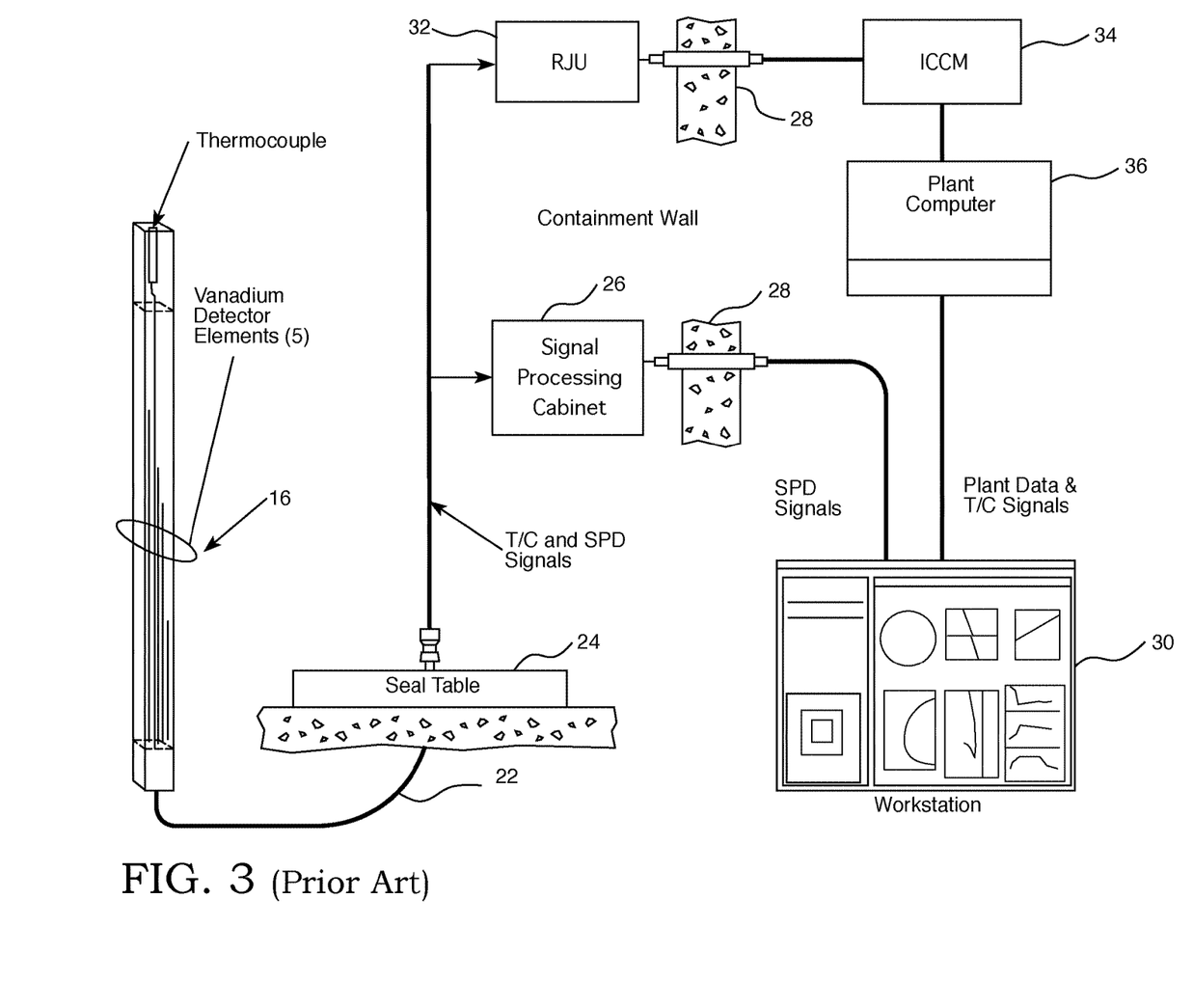
FIG. 3 is a schematic layout of an in-core monitoring system.

FIG. 3 shows an example of a core monitoring system presently offered for sale by Westinghouse Electric Company LLC, Cranberry, Pa., with a product name WINCISE™ that employs fixed in-core instrumentation thimble assemblies 16 within the instrument thimbles of the fuel assemblies within the core to measure the core's power distribution. Cabling 22 extends from the instrument thimble assemblies 16 through the containment seal table 24 to a single processing cabinet 26 where the outputs are conditioned, digitized and multiplexed and transmitted through the containment walls 28 to a computer workstation 30 where they can be further processed and displayed. The thermocouple signals from the in-core instrumentation thimble assemblies are also sent to a reference junction unit 32 which transmits the signals to an inadequate core cooling monitor 34 which communicates with the plant computer 36 which is also connected to the workstation 30. Because of the hostile environment within the containment walls 28, the signal processing cabinet 26 has to be located a significant distance away from the core and the signal has to be sent from the detectors 16 to the signal processing cabinet 26 through specially constructed cables that are extremely expensive and the long runs reduce the signal to noise ratio. Unfortunately, these long runs of cable have proved necessary because the electronics for signal processing has to be shielded from the highly radioactive environment surrounding the core region.

In previous nuclear plant designs, the in-core detectors entered the reactor vessel from the lower hemispherical end and entered the fuel assemblies' instrument thimble from the bottom fuel assembly nozzle. In at least some of the current generation of nuclear plant designs, such as the AP1000 nuclear plant, the in-core monitoring access is located at the top of the reactor vessel, which means that during refueling all in-core monitoring cabling will need to be removed before accessing the fuel. A wireless in-core monitor that is self-contained within the fuel assemblies and wirelessly transmits the monitored signals to a signal receiver positioned inside the reactor vessel but away from the fuel would allow immediate access to the fuel without the time-consuming and expensive process of disconnecting, withdrawing and storing the in-core monitoring cables before the fuel assemblies could be accessed, and restoring those connections after the refueling process is complete. A wireless alternative would thus save days in the critical path of a refueling outage. A wireless system also allows every fuel assembly to be monitored, which significantly increases the amount of core power distribution information that is available.

However, a wireless system requires that electronic components be located at or near the reactor core where gamma and neutron radiation and high temperatures would render semi-conductor electronics inoperable within a very short time. Vacuum tubes are known to be radiation insensitive, but their size and electric current demands have made their use impractical until recently. Recent developments in micro-electromechanical devices have allowed vacuum tubes to shrink to integrated circuit component sizes and significantly reduce power draw demands. Such a system is described in U.S. patent application Ser. No. 12/986,242, entitled "Wireless In-core Neutron Monitor," filed Jan. 7, 2011. The primary electrical power source for the signal transmitting electrical hardware for the embodiment disclosed in the afore-noted patent application is a rechargeable battery shown as part of an exemplary power supply. The charge on the battery is maintained by the use of the electrical power produced by a dedicated power supply self-powered detector element that is contained within the power supply, so that the nuclear radiation in the reactor is the ultimate power source for the device and will continue so long as the dedicated power supply self-powered detector element is exposed to an intensity of radiation experienced within the core.

Accordingly, one object of this disclosed concept is to provide a mechanism to transmit data of environmental conditions within a fuel rod of a fuel assembly to a remote location.

SUMMARY

These needs and others are met by the disclosed concept, which are directed to an improved nuclear reactor system, transmitter device therefor, and associated method of measuring a number of environmental conditions.

As one aspect of the disclosed concept, a transmitter device is provided. The transmitter device includes a neutron detector structured to generate electrical current from neutron flux, an oscillator circuit having an electrostatic switch electrically connected to the neutron detector, and an antenna electrically connected with the electrostatic switch. The oscillator circuit is structured to pulse the antenna. The antenna is structured to emit a signal corresponding to a number of characteristic values of the oscillator circuit.

As another aspect of the disclosed concept, a nuclear system is provided. The nuclear reactor system includes a fuel assembly having a fuel rod, and the aforementioned transmitter device. The neutron detector is located in the fuel rod.

As another aspect of the disclosed concept, a method of measuring a number of environmental conditions with the aforementioned transmitter device is provided. The method includes the steps of generating an electrical current with a neutron detector, storing energy in a capacitor until a trigger voltage of an electrostatic switch of an oscillator circuit is reached, and emitting a signal with an antenna corresponding to a number of characteristic values of the oscillator circuit.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

The primary side of nuclear power generating systems which are cooled with water under pressure comprises a closed circuit which is isolated from and in heat exchange relationship with a secondary side for the production of useful energy. The primary side comprises the reactor vessel enclosing a core internal structure that supports a plurality of fuel assemblies containing fissile material, the primary circuit within heat exchange steam generators, the inner volume of a pressurizer, pumps and pipes for circulating pressurized water; the pipes connecting each of the steam generators and pumps to the reactor vessel independently. Each of the parts of the primary side comprising a steam generator, a pump and a system of pipes which are connected to the reactor vessel form a loop of the primary side.

Figure 4:
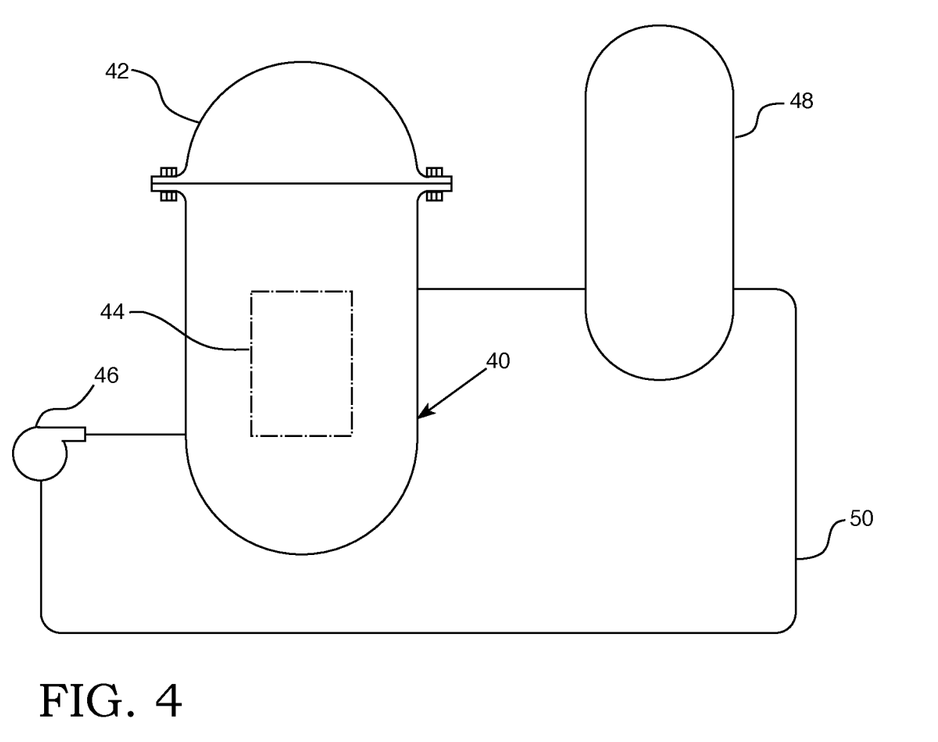
FIG. 4 is a simplified schematic of a nuclear reactor system.

For the purpose of illustration, FIG. 4 shows a simplified nuclear reactor system, including a generally cylindrical pressure vessel 40, having a closure head 42 enclosing a nuclear core 44. A liquid reactor coolant, such as water, is pumped into the vessel 40 by pump 46 through the core 44 where heat energy is absorbed and is discharged to a heat exchanger 48, typically referred to as a steam generator, in which heat is transferred to a utilization circuit (not shown), such as a steam driven turbine generator. The reactor coolant is then returned to the pump 46 completing the primary loop. Typically, a plurality of the above-described loops are connected to a single reactor vessel 40 by reactor coolant piping 50.

Figure 5:
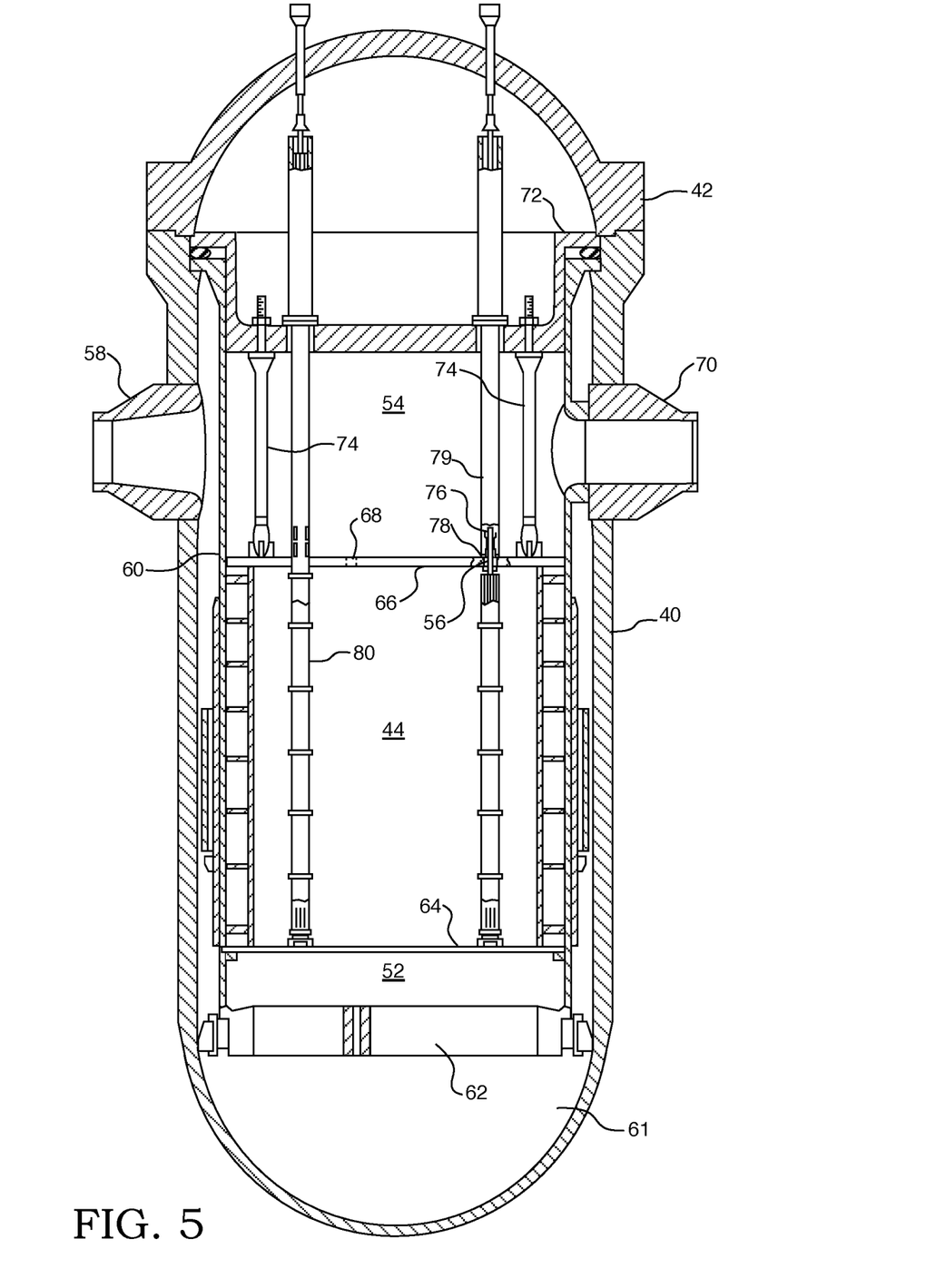
FIG. 5 is an elevational view, partially in section, of a nuclear reactor vessel and interior components.

An exemplary reactor design to which this invention can be applied is illustrated in FIG. 5. In addition to the core 44 comprised of a plurality of parallel, vertical, co-extending fuel assemblies 80, for purpose of this description, the other vessel internal structures can be divided into the lower internals 52 and the upper internals 54. In conventional designs, the lower internals' function is to support, align and guide core components and instrumentation as well direct flow within the vessel. The upper internals 54 restrain or provide a secondary restraint for the fuel assemblies 80 (only two of which are shown for simplicity in this figure), and support and guide instrumentation and components, such as control rods 56. In the exemplary reactor shown in FIG. 5, coolant enters the reactor vessel 40 through one or more inlet nozzles 58, flows down through an annulus between the reactor vessel 40 and the core barrel 60, is turned 180° in a lower reactor vessel plenum 61, passes upwardly through a lower support plate and a lower core plate 64 upon which the fuel assemblies 80 are seated, and through and about the assemblies. In some designs, the lower support plate 62 and the lower core plate 64 are replaced by a single structure, the lower core support plate that has the same elevation as 62. Coolant exiting the core 44 flows along the underside of the upper core plate 66 and upwardly and through a plurality of perforations 68 in the upper core plate 66. The coolant then flows upwardly and radially to one or more outlet nozzles 70.

The upper internals 54 can be supported from the vessel or the vessel head 42 and includes an upper support assembly 72. Loads are transmitted between the upper support assembly 72 and the upper core plate 66 primarily by a plurality of support columns 74. Each support column is aligned above a selected fuel assembly 80 and perforations 68 in the upper core plate 66.

The rectilinearly movable control rods 56 typically include a drive shaft 76 and a spider assembly 78 of neutron poison rods that are guided through the upper internals 54 and into aligned fuel assemblies 80 by control rod guide tubes 79.

Figure 6:
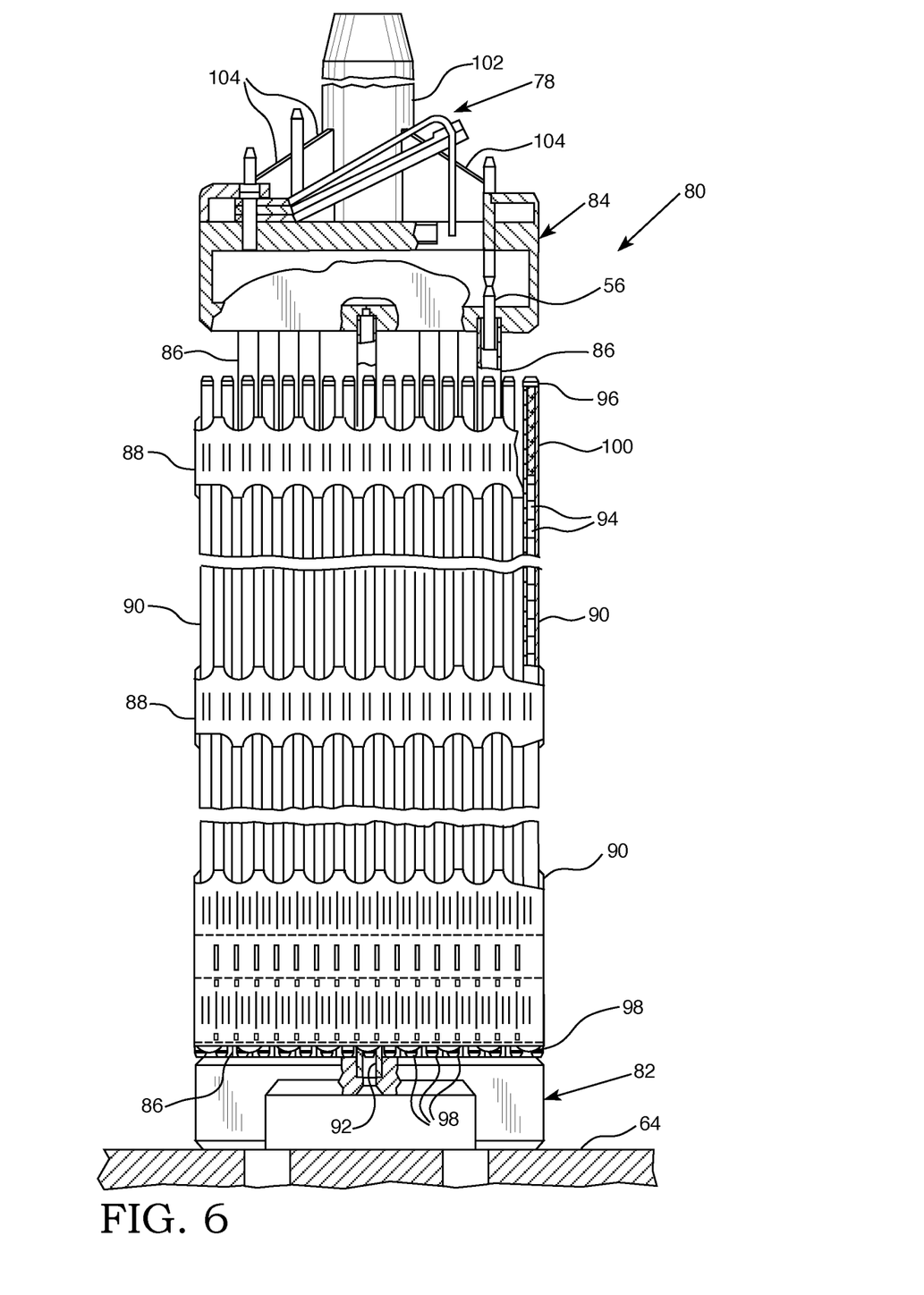
FIG. 6 is an elevational view, partially in section, of a nuclear fuel assembly that contains an in-core nuclear instrument thimble assembly.

FIG. 6 is an elevational view represented in vertically shortened form, of a fuel assembly being generally designated by reference character 80. The fuel assembly 80 is the type used in a pressurized water reactor, such as the reactor of FIG. 5, and has a structural skeleton which at its lower end includes a bottom nozzle 82. The bottom nozzle 82 supports the fuel assembly on the lower core support plate 64 in the core region of the nuclear reactor. In addition to the bottom nozzle 82, the structural skeleton of the fuel assembly 80 also includes a top nozzle 84 at its upper end and a number of guide tubes or thimbles 86 which extend longitudinally between the bottom and top nozzles 82 and 84 and at opposite ends are rigidly attached thereto.

The fuel assembly 80 further includes a plurality of transverse grids 88 axially spaced along and mounted to the guide thimbles 86 (also referred to as guide tubes) and an organized array of elongated fuel rods 90 transversely spaced and supported by the grids 88. Although it cannot be seen in FIG. 6, the grids 88 are conventionally formed from orthogonal straps that are interleaved in an egg-crate pattern with the adjacent interface of four straps defining approximately square support cells through which the fuel rods 90 are supported in transversely spaced relationship with each other. In many conventional designs, springs and dimples are stamped into the opposing walls of the straps that form the support cells. The springs and dimples extend radially into the support cells and capture the fuel rods therebetween; inserting pressure on the fuel rod cladding to hold the rods in position. Also, the assembly 80 has an instrumentation tube 92 located in the center thereof that extends between and is mounted to the bottom and top nozzles 82 and 84. With such an arrangement of parts, the fuel assembly 80 forms an integral unit capable of being conveniently handled without damaging the assembly of parts.

As mentioned above, the fuel rods 90 in the array thereof in the assembly 80 are held in spaced relationship with one another by the grids 88 spaced along the fuel assembly length. Each fuel rod 90 includes a plurality of nuclear fuel pellets 94 and is closed at its opposite ends by upper and lower end plugs 96 and 98. The fuel pellets 94 are maintained in a stack by a plenum spring 100 disposed between the upper end plug 96 in the top of the pellet stack. The fuel pellets 94, composed of fissile material, are responsible for creating the reactive power of the reactor. The cladding, which surrounds the pellets, functions as a barrier to prevent fission byproducts from entering the coolant and further contaminating the reactor system.

To control the fission process, a number of control rods 56 are reciprocally movable in the guide thimbles 86 located at predetermined positions in the fuel assembly 80. Specifically, a rod cluster control mechanism (also referred to as a spider assembly) 78 positioned above the top nozzle 84 supports the control rods 56. The rod cluster control mechanism has an internally threaded cylindrical hub member 102 with a plurality of radially extending flukes or arms 104 that with the control rods 56 form the spider assembly 78 that was previously mentioned with respect to FIG. 5. Each arm 104 is interconnected to the control rods 56 such that the control mechanism 78 is operable to move the control rods vertically in the guide thimbles to thereby control the fission process in the fuel assembly 80, under the motor power of control rod drive shafts 76 (shown in FIG. 5) which are coupled to the control rod hubs 102, all in a well known manner.

Figures 7, 8:
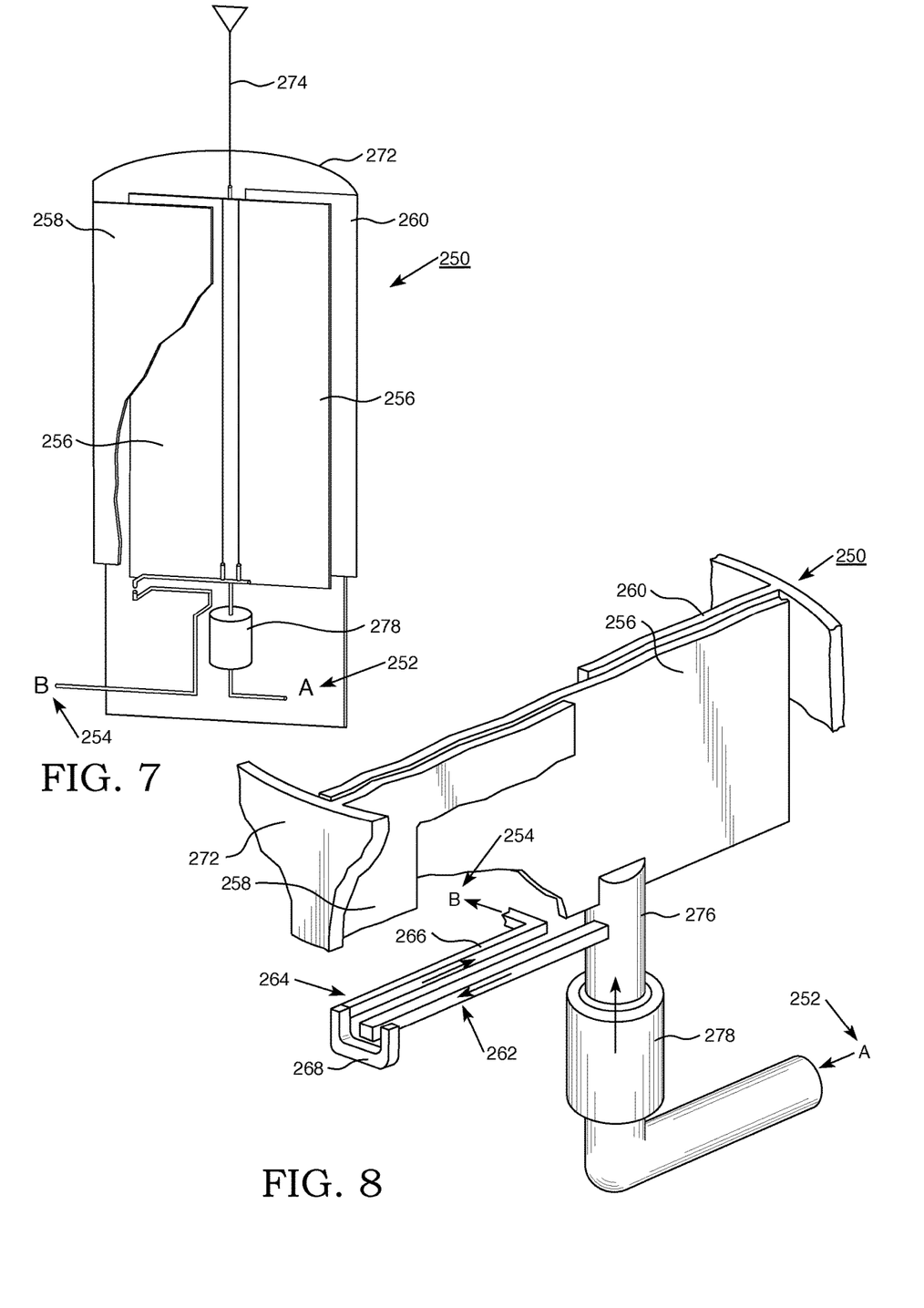
FIG. 7 is a schematic, partially cutaway, view of an electrostatic switch, in accordance with one non-limiting embodiment of the disclosed concept.
FIG. 8 is an enlarged schematic view of a portion of the electrostatic switch of FIG. 7.

As mentioned above, it is often desirable to transmit data of a number of environmental conditions within a fuel rod (e.g., one of the fuel rods 90 of the fuel assembly 80) to a remote location. FIGS. 7 and 8 show different schematic views of a component of such a device able to perform such a function. Specifically, FIGS. 7 and 8 show different schematic views of an electrostatic switch 250 that may be employed in a transmitter device (e.g., without limitation, transmitter device 200, shown schematically in FIG. 9). The example electrostatic switch 250 includes an A terminal 252, a B terminal 254, a first vane 256 electrically connected with the A terminal 252, and a number of other vanes 258, 260 electrically connected with the B terminal 254. In one example embodiment, the vanes 258, 260 form a unitary component made from a single piece of material. Furthermore, it will be appreciated that the first vane 256 is configured to be located between the second and third vanes 258, 260. Referring to FIG. 8, the electrostatic switch 250 further includes a first conductor 262 and a second conductor 264. The first conductor 262 is electrically connected with the A terminal 252 and the first vane 256. The second conductor 264 is electrically connected with the B terminal 254 and the second and third vanes 258, 260. The second and third vanes 258, 260 may be electrically connected with the B terminal 254 via external wiring (not shown). As will be discussed below, the electrostatic switch 250 is structured to move from an OPEN position to a CLOSED position. As shown in FIG. 8, the second conductor 264 includes a generally linear portion 266, and the electrostatic switch includes a bracket (e.g., without limitation, U-shaped bracket 268) extending from the linear portion 266. When the electrostatic switch 250 is in OPEN position, the first conductor 262 is spaced from the bracket 268. When the electrostatic switch 250 moves from the OPEN position to the CLOSED position, the first conductor 262 moves into engagement with the bracket 268.

Referring again to FIG. 7, the electrostatic switch 250 further includes an external housing 272 and a support fiber 274 (shown schematically). In one example embodiment, the external housing 272 is cylindrical-shaped (see, for example, FIG. 8). In one optional embodiment, the housing 272 and the second and third vanes 258, 260 form a unitary component made from a single piece of material. Furthermore, it will be appreciated that the second and third vanes 258, 260 preferably extend from opposite sides of the housing 272 to proximate a middle region of the housing 272. Continuing to refer to FIG. 7, it will be appreciated that the first vane 256 is located internal with respect to the housing 272. Additionally, the support fiber 274 is coupled to the first vane 256 and the housing 272, and is configured to provide a torsional preload on the first vane 256. However, when the electrostatic switch 250 moves from the OPEN position to the CLOSED position, electrostatic attractive forces between the first vane 256 and the second and third vanes 258, 260 overcome the preload of the support fiber 274 in order to move the electrostatic switch 250 to the CLOSED position.

Additionally, the electrostatic switch 250 has a mechanism to be maintained in the CLOSED position. Specifically, as shown in FIG. 8, the linear portion 266 of the second conductor 264 is located substantially parallel to the first conductor 262. As such, when the electrostatic switch is in the CLOSED position, current flows through the first conductor 262 in a first direction (see arrow in first conductor 262) and through the linear portion 266 of the second conductor 264 in a second direction (see arrow in linear portion 266) generally opposite the first direction. As a result, this creates a repulsive electromagnetic force between the first conductor 262 and the linear portion 266 of the second conductor 264 in order to maintain the electrostatic switch 250 in the CLOSED position. Accordingly, as long as current is flowing (e.g., even at relatively low levels), the electromagnetic repulsive force maintains the electrostatic switch 250 in the CLOSED position. The electrostatic switch 250 will not return to the OPEN position until the repulsive force due to the current drops below the torsional preload of the support fiber 274. This may occur when the current drops to near zero amperes. Thus, the electrostatic switch 250 is closed by electrostatic forces from an applied voltage, is maintained in the CLOSED position by electromagnetic forces due to the current flowing during closure, and then moves to the OPEN position when the current flow drops and the electromagnetic forces dissipate.

Continuing to refer to FIG. 8, in one optional embodiment, the electrostatic switch 250 further includes a support post 276, a container 278, and an electrically conductive substance (not shown) located internal with respect to the container 278. The support post 276 is mechanically coupled to the first vane 256 and electrically connected to the A terminal 252. In this manner, the support post 276 advantageously provides structural support for the first vane 256. Furthermore, the first conductor 262 extends from the support post 276.

The container 278, with the electrically conductive substance located therein, electrically connects the support post 276 to the A terminal 252. The electrically conductive substance is preferably a fusible metal alloy that is solid at room temperature. In this solid state, the fusible metal alloy in the container 278 provides structural support to the vanes 256, 258, 260 to minimize and/or prevent damage during fabrication and shipping of the electrostatic switch 250. However, in operation, once the fuel heats up, the fusible metal alloy melts and the electrostatic switch 250 becomes operational.

When the electrostatic switch 250 is in the OPEN position, the first vane 256 does not engage either of the second or third vanes 258, 260. In one optional embodiment, when the electrostatic switch 250 is in the OPEN position, the first vane 256 is located substantially parallel to and is spaced from the second and third vanes 258, 260. It will be appreciated that in this OPEN position, a torsional preload on the support fiber 274, and thus on the first vane 256, maintains the electrostatic switch 250 in the OPEN position. As will further be discussed below, when a voltage is applied to the electrostatic switch 250, electrostatic forces are developed that attract the first vane 256 toward the second and third vanes 258, 260. Once this force exceeds the torsional preload of the support fiber 274, the first vane 256 will begin to rotate and will cause the electrostatic switch 250 to close. Accordingly, when the electrostatic switch 250 moves from the OPEN position to the CLOSED position, the first vane 256 rotates toward the second and third vanes 258, 260.

Figure 9:
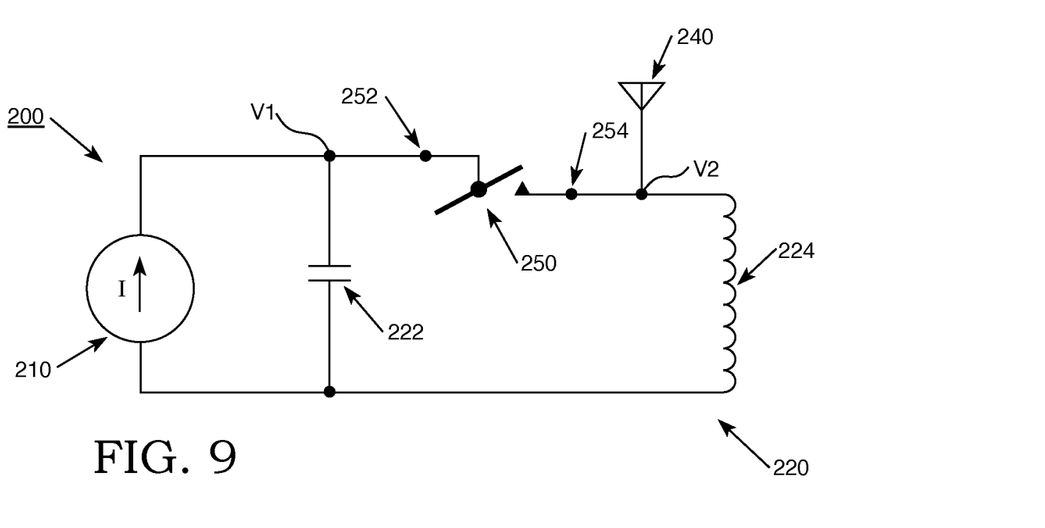
FIG. 9 is a schematic circuitry diagram of a transmitter device, including the electrostatic switch of FIGS. 7 and 8, in accordance with one non-limiting embodiment of the disclosed concept.
Figure 10:
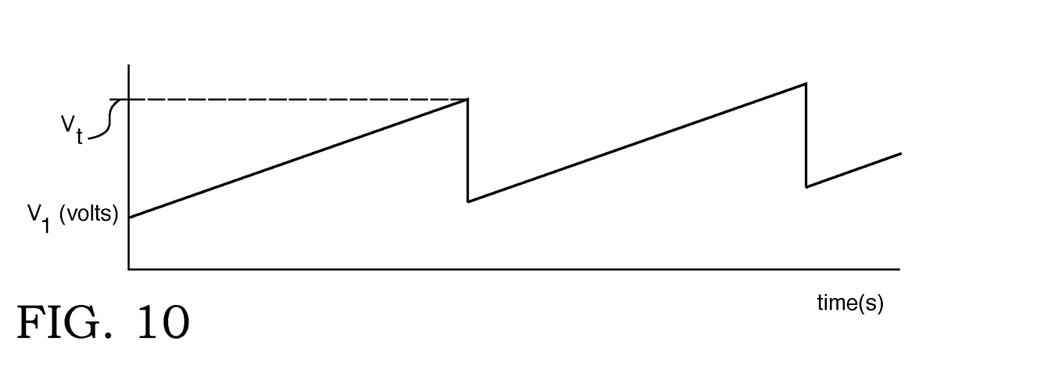
FIG. 10 is a graph showing voltage at a location in the transmitter device of FIG. 9 versus time.

The transmitter device 200, which includes the electrostatic switch 250, will now be discussed in greater detail in connection with FIGS. 9-11. As shown in FIG. 9, the transmitter device 200 includes a self-powered neutron detector 210, an oscillator circuit 220 electrically connected to the neutron detector 210, and an antenna 240. The neutron detector 210 is configured to be located in one of the fuel rods 90 (FIG. 6). The example oscillator circuit 220 includes a capacitor 222, an inductor 224 configured to be electrically connected with the capacitor 222, and the electrostatic switch 250. As shown, the capacitor 222 is electrically connected with the neutron detector 210. The electrostatic switch 250 is also electrically connected to the neutron detector 210 and the antenna 240. In operation, the oscillator circuit 220 is structured to pulse the antenna 240, and the antenna 240 is structured to emit a signal corresponding to a number of characteristic values of the oscillator circuit 220, as will be discussed below.

When the transmitter device 200 is located within one of the fuel rods 90 (FIG. 6) of the fuel assembly 80 (FIGS. 5 and 6), the neutron detector 210 is structured to generate an electrical current from neutron flux. Accordingly, the neutron detector 210, and thus the transmitter device 200, is advantageously self-powered (i.e., devoid of a separate powering mechanism). That is, the transmitter device 200 has only one single powering mechanism, that powering mechanism being the neutron detector 210. Additionally, the transmitter device 200 is advantageously devoid of semiconductors. Many known attempts at providing a wireless mechanism to communicate data on environmental conditions typically require more power than is available from a neutron detector, and/or are not able to withstand the relatively harsh radiation environment due to the inclusion of semiconductors. In the example of FIG. 9, the capacitor 222 is electrically connected with the A terminal 252 of the electrostatic switch 250, and the antenna 240 is electrically connected with the B terminal 254 of the electrostatic switch 250.

The operation of the transmitter device 200 will now be discussed in detail. When the transmitter device 200 is located in one of the fuel rods 90 (FIG. 6), the neutron detector 210 functions as a current source that charges the capacitor 222. The voltage across the capacitor 222 increases as the energy is stored and it continues to climb until a trigger voltage $V_t$ (see, for example, FIG. 10) of the electrostatic switch 250 is reached. See, for example, FIG. 10, wherein voltage $V_1$ is measured at a location of the transmitter device 200 in FIG. 9, and the trigger voltage $V_t$ of the electrostatic switch 250 is a predetermined voltage that is reached at this location. As shown, the voltage $V_1$ increases until the trigger voltage $V_t$ of the electrostatic switch 250 is reached. Once the trigger voltage $V_t$ of the electrostatic switch 250 is reached, the electrostatic switch 250 becomes conductive such that the A and B terminals 252, 254 electrically connect the capacitor 222 to the antenna 240. Stated differently, when the trigger voltage $V_t$ of the electrostatic switch 250 is reached, the electrostatic switch 250 moves from the OPEN position to the CLOSED position and connects the capacitor 222 to the inductor 224, thereby creating the oscillator circuit 220. This closure by the electrostatic switch causes a relatively strong oscillation of the oscillator circuit 220, which is inherently unstable, for a short period of time. The damped oscillation continues until the energy is dissipated by electromagnetic emissions from the antenna 240 and other losses (e.g., resistive losses).

Figure 11:
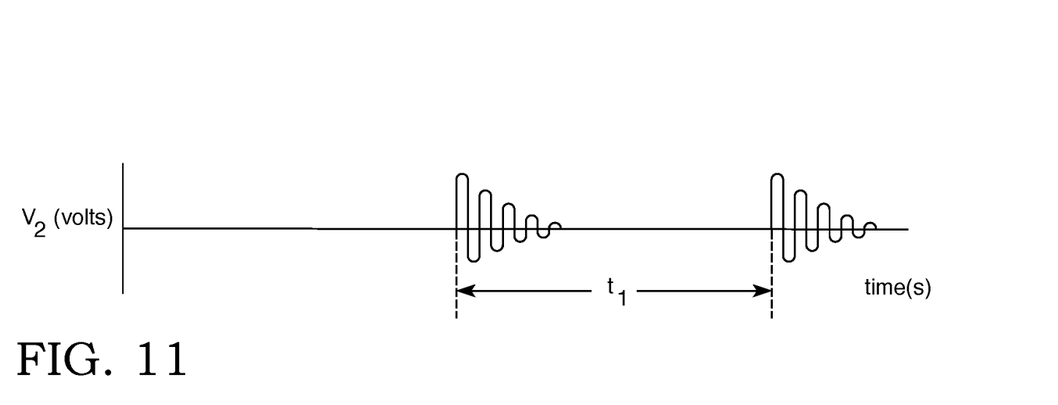
FIG. 11 is a graph showing voltage at another location in the transmitter device of FIG. 9 versus time.

FIG. 11 shows a graph of voltage $V_2$ versus time measured in the oscillator circuit 220. As shown, the voltage $V_2$ generally begins at zero volts, oscillates for a relatively short period of time, and thereafter returns to zero volts before repeating the cycle. The dampening of the oscillations is due to energy being dissipated by electromagnetic emissions from the antenna 240 and resistive losses. Accordingly, the oscillator circuit 220 pulses the antenna 240, which emits a wireless signal.

It will be appreciated that the period between the pulsed signals emitted by the antenna 240 corresponds inversely to the neutron flux detected by the neutron detector 210. More specifically, the current generated by the neutron detector 210 is directly proportional to the neutron flux within the corresponding fuel rod 90 (FIG. 6), and the trigger voltage $V_t$ of the electrostatic switch 250 is relatively constant. As such, the period between pulses (see, for example, $t_1$ in FIG. 11) is also inversely proportional to the neutron flux within the fuel rod 90 (FIG. 6). Therefore, a suitable wireless receiver receiving the signal emitted by the antenna 240 can readily be calibrated to determine the neutron flux within the fuel rod 90 (FIG. 6). Additionally, the energy of the pulsed transmissions of the antenna 240 remains essentially the same even if the reactor core power is very low. The pulses simply occur less often. Furthermore, because the frequency of the transmitter device 200 is independent of pulse operation, a device designer is able to select the frequency of the transmitter device 200. This advantageously facilitates the use of many different transmitter devices at different locations in the fuel assembly 80 (FIGS. 5 and 6), and in other fuel assemblies in the core. It will be appreciated that the neutron detector 210 and sensors could be located at advantageous locations along the height of the fuel assembly 80 (FIGS. 5 and 6), whereas the transmitter circuit would generally always be in the fuel assembly's 80 (FIGS. 5 and 6) top plenum (e.g., any fuel rod or assembly). An operator would be able to identify each individual transmitter device by its associated frequency, which is dependent on the values of the capacitance of the capacitor 222 and the inductance of the inductor 224. Accordingly, environmental conditions such as neutron flux are advantageously able to be monitored wirelessly at many different locations within the fuel assembly 80 (FIGS. 5 and 6).

Figure 12:
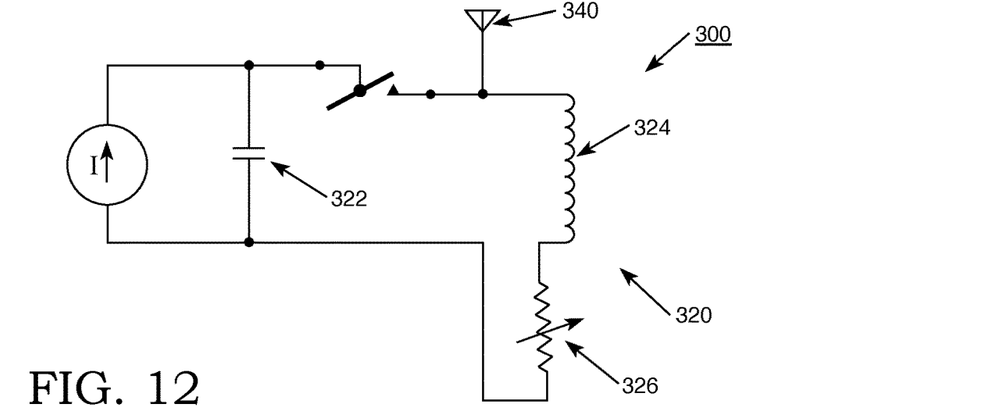
FIG. 12 is a schematic circuitry diagram of another transmitter device, in accordance with another non-limiting embodiment of the disclosed concept.

FIG. 12 shows a schematic circuitry diagram of another transmitter device 300, in accordance with another non-limiting embodiment of the disclosed concept. As shown, the transmitter device 300 is structured similar to the transmitter device 200 (FIG. 9), and like components are labeled with like reference numbers. For ease of illustration and economy of disclosure, only the oscillator circuit 320 and the antenna 340 are indicated with reference numbers. However, as shown, the oscillator circuit 320 of the transmitter device 300 further includes a resistance temperature detector 326 electrically connected in series with the inductor 324 and electrically connected to the capacitor 322. The resistance temperature detector 326 increases its electrical resistance as the temperature of the environment in which it is located increases. In accordance with one aspect of the disclosed concept, the resistance temperature detector 326 alters the signal emitted by the antenna 340 in a detectable way. More specifically, the amplitude decay rate of the voltage of the oscillator circuit 320 will be altered with the inclusion of the resistance temperature detector 326. Accordingly, the change in the amplitude decay rate measured by a suitable wireless receiver will allow an operator to readily determine a given temperature at a location within the fuel rod 90 (FIG. 6). It follows that the transmitter device 300 is advantageously able to provide an indication to an operator of neutron flux (i.e., in the same manner as the transmitter device 200 shown in FIG. 9) and also temperature within the fuel rod 90 (FIG. 6).

Figure 13:
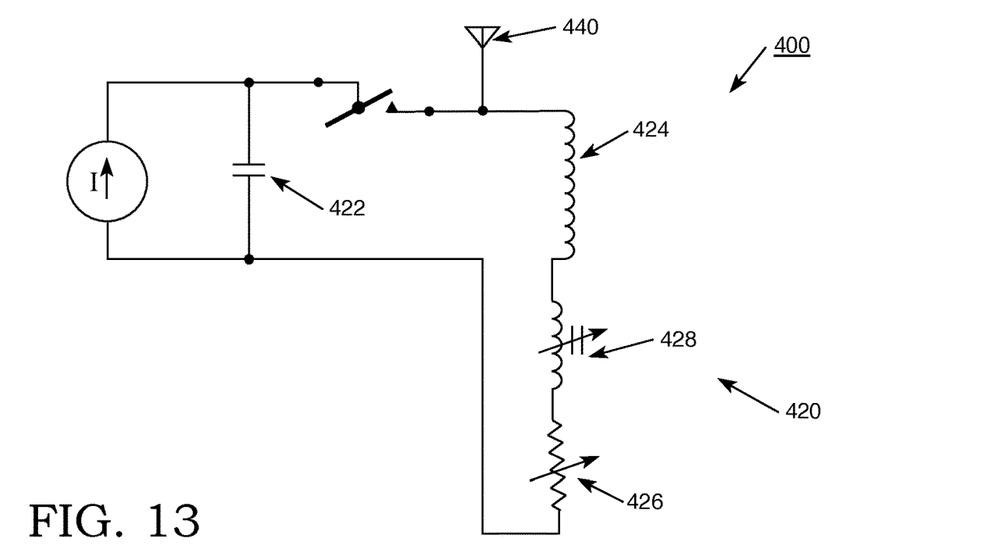
FIG. 13 is a schematic circuitry diagram of another transmitter device, in accordance with another non-limiting embodiment of the disclosed concept.
Figure 14:
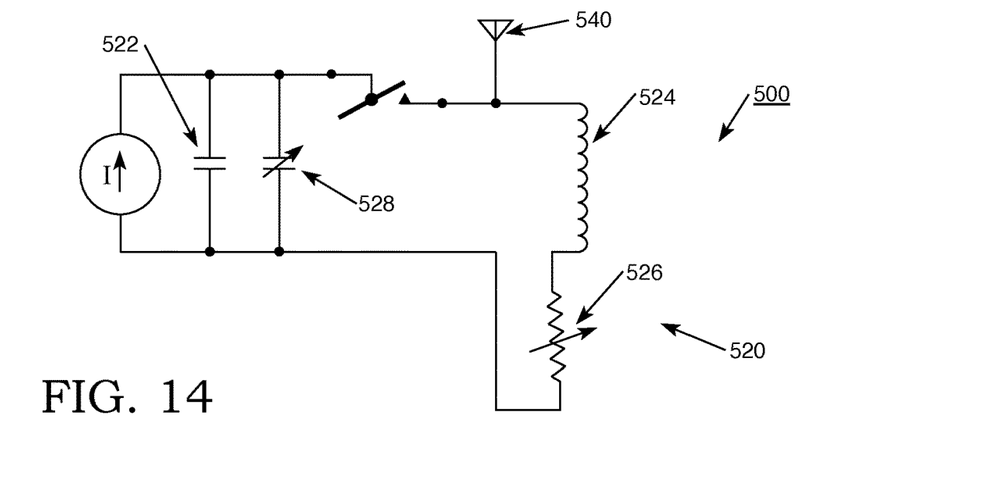
FIG. 14 is a schematic circuitry diagram of another transmitter device, in accordance with another non-limiting embodiment of the disclosed concept.

FIGS. 13 and 14 show schematic circuitry diagrams of two other transmitter devices 400, 500, respectively, in accordance with other non-limiting embodiments of the disclosed concept. As shown, the transmitter devices 400, 500 are structured similar to the transmitter devices 200, 300 (FIGS. 9 and 12), and like components are labeled with like reference numbers. For ease of illustration and economy of disclosure, only the antennas 440, 540 and the oscillator circuits 420, 520 are identified with reference numbers. As shown in FIG. 13, the oscillator circuit 420 further includes a second inductor (e.g., without limitation, variable inductor 428) electrically connected in series with the first inductor 424 and the resistance temperature detector 426. As shown in FIG. 14, the oscillator circuit 520 further includes a variable capacitor 528 electrically connected in parallel with the first capacitor 522. The variable capacitor 528 is also electrically connected to the inductor 524 and the resistance temperature detector 526. Advantageously, environmentally induced changes in the electrical values of either the variable inductor 428 or the variable capacitor 528 will produce a detectable shift in the pulse transmission frequency.

It will be appreciated that the transmitter devices 400, 500 are advantageously able to provide an indication to an operator of up to three environmental conditions within the fuel rods 90 (FIG. 6). For example, the transmitter devices 400, 500 each, via the emitted signals of the respective antennas 440, 540, are each able to communicate to a wireless receiver data corresponding to the neutron flux and the temperature within the fuel rod 90 (FIG. 6) in the same manner as the transmitter device 300, discussed above. Additionally, the variable inductor 428 (FIG. 13) and the variable capacitor 528 (FIG. 14) are each structured to alter the frequency of the emitted signal of the respective antennas 440, 540 in a detectable way. The altered frequency provides a mechanism by which a third environmental condition (e.g., without limitation, pressure, total neutron dose of a fuel rod over time, water flow rate) can be measured by the transmitter devices 400, 500 and reported wirelessly to a suitable receiver. For example, the pressure within a fuel rod may create a deformation that causes a movement near a coil of the variable inductor 428 to cause a detectable frequency shift in the emitted signal of the antenna 440, thus allowing the pressure to be monitored wirelessly. It will be appreciated that a method of measuring a number of environmental conditions with one of the transmitter devices 200, 300, 400, 500 includes the steps of generating an electrical current with the neutron detector 210, storing energy in the capacitor 222, 322, 422, 522 until a trigger voltage $V_t$ of the electrostatic switch 250 is reached, and emitting a signal with the antenna 240, 340, 440, 540 corresponding to a number of characteristic values of the oscillator circuit 220, 320, 420, 520. The method may further include altering the signal emitted by the antenna 340, 440, 540 with the resistance temperature detector 326, 426, 526. The method may also further include altering the signal emitted by the antenna 440 with the second inductor 428.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A transmitter device comprising:
a neutron detector structured to generate electrical current from neutron flux;
an oscillator circuit comprising an electrostatic switch electrically connected to said neutron detector, wherein said electrostatic switch is moveable based on the neutron detector; and
an antenna electrically connected with said electrostatic switch,
wherein said oscillator circuit is structured to pulse said antenna based on the neutron detector,
wherein a period between pulses is related to the neutron flux, and
wherein said antenna is structured to emit a signal corresponding to a number of characteristic values of said oscillator circuit.

2. The transmitter device of claim 1 wherein said oscillator circuit further comprises a capacitor and an inductor configured to be electrically connected with said capacitor; and wherein said capacitor is electrically connected with said neutron detector.

3. The transmitter device of claim 2 wherein said electrostatic switch comprises a first terminal, a second terminal, a first vane electrically connected with said first terminal, and at least one other vane electrically connected with said second terminal; wherein said capacitor is electrically connected with one of said first terminal or said second terminal; and wherein said antenna is electrically connected with the other of said first terminal or said second terminal.

4. The transmitter device of claim 3 wherein said electrostatic switch further comprises a first conductor and a second conductor; wherein said first conductor is electrically connected with said first terminal and said first vane; wherein said second conductor is electrically connected with said second terminal and said at least one other vane; wherein said electrostatic switch is structured to move from an OPEN position to a CLOSED position; wherein said electrostatic switch further comprises a bracket extending from a portion of said second conductor; wherein, when said electrostatic switch is in the OPEN position, said first conductor is spaced from said bracket; and wherein, when said electrostatic switch moves from the OPEN position to the CLOSED position, said first conductor moves into engagement with said bracket.

5. The transmitter device of claim 4 wherein said electrostatic switch further comprises a housing and a support fiber; wherein said first vane is disposed internal with respect to said housing; wherein said support fiber is coupled to said first vane and said housing and is configured to provide a torsional preload on said first vane; wherein, when said electrostatic switch moves from the OPEN position to the CLOSED position, electrostatic attractive forces between said first vane and said at least one other vane overcome the preload of said support fiber in order to move said electrostatic switch to the CLOSED position.

6. The transmitter device of claim 4 wherein said portion of said second conductor is disposed substantially parallel to said first conductor; wherein, when said electrostatic switch is in the CLOSED position, current flows through said first conductor in a first direction; and wherein, when said electrostatic switch is in the CLOSED position, current flows through said portion of said second conductor in a second direction generally opposite the first direction, thereby creating a repulsive electromagnetic force between said first conductor and said portion of said second conductor in order to maintain said electrostatic switch in the CLOSED position.

7. The transmitter device of claim 4 wherein said electrostatic switch further comprises a support post mechanically coupled to said first vane and electrically connected to said first terminal; and wherein said first conductor extends from said support post.

8. The transmitter device of claim 7 wherein said electrostatic switch further comprises a container and an electrically conductive substance disposed internal with respect to said container; and wherein said container electrically connects said support post to said first terminal.

9. The transmitter device of claim 4 wherein said at least one other vane comprises a second vane and a third vane each electrically connected with said second terminal; wherein said first vane is disposed between said second vane and said third vane; and wherein, when said electrostatic switch moves from the OPEN position to the CLOSED position, said first vane rotates toward said second vane and said third vane.

10. The transmitter device of claim 9 wherein said second vane and said third vane form a unitary component made from a single piece of material.

11. The transmitter device of claim 9 wherein, when said electrostatic switch is in the OPEN position, said first vane is disposed parallel to said second vane and said third vane.

12. The transmitter device of claim 2 wherein said oscillator circuit further comprises a resistance temperature detector electrically connected in series with said inductor; and wherein said resistance temperature detector is structured to alter the signal emitted by said antenna.

13. The transmitter device of claim 2 wherein said oscillator circuit further comprises a second inductor electrically connected in series with said inductor; and wherein said second inductor is structured to alter the signal emitted by said antenna.

14. The transmitter device of claim 13 wherein said second inductor is a variable inductor.

15. The transmitter device of claim 1 wherein said transmitter device is devoid of a semiconductor.

16. The transmitter device of claim 1 wherein said transmitter device comprises only one single powering mechanism; and wherein said one single powering mechanism is said neutron detector.

17. A nuclear reactor system comprising:
a fuel assembly having a fuel rod; and
a transmitter device comprising:
a neutron detector disposed within said fuel rod, said neutron detector being structured to generate electrical current from neutron flux,
an oscillator circuit comprising an electrostatic switch electrically connected to said neutron detector, wherein said electrostatic switch is moveable based on the neutron detector, and
an antenna electrically connected with said electrostatic switch,
wherein said oscillator circuit is structured to pulse said antenna based on the neutron detector,
wherein a period between pulses is related to the neutron flux, and
wherein said antenna is structured to emit a signal corresponding to a number of characteristic values of said oscillator circuit.

* * * * *